March 21, 1961 E. W. GENT ET AL 2,975,822
MACHINE FOR EMBEDDING BEADS IN A SHEET
Filed Dec. 31, 1947 5 Sheets-Sheet 1

INVENTORS
E.W. GENT
W.W. WERRING
BY

ATTORNEY

March 21, 1961 E. W. GENT ET AL 2,975,822
MACHINE FOR EMBEDDING BEADS IN A SHEET
Filed Dec. 31, 1947 5 Sheets-Sheet 2

INVENTORS E.W. GENT
W.W. WERRING
BY
ATTORNEY

March 21, 1961  E. W. GENT ET AL  2,975,822
MACHINE FOR EMBEDDING BEADS IN A SHEET
Filed Dec. 31, 1947  5 Sheets-Sheet 3

INVENTORS  E.W. GENT
W.W. WERRING
BY
ATTORNEY

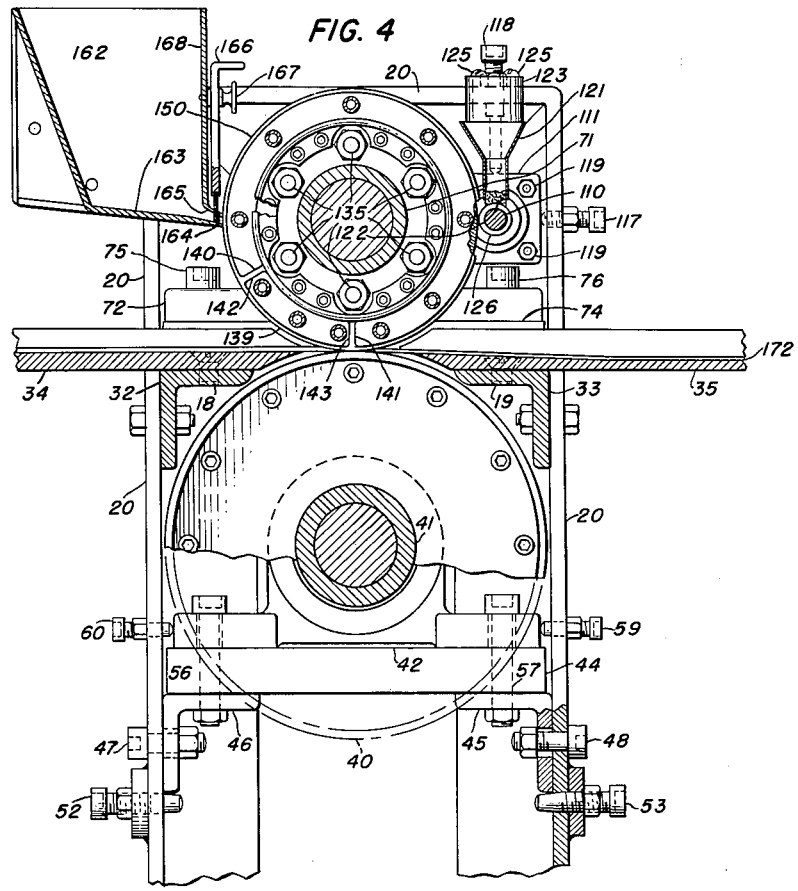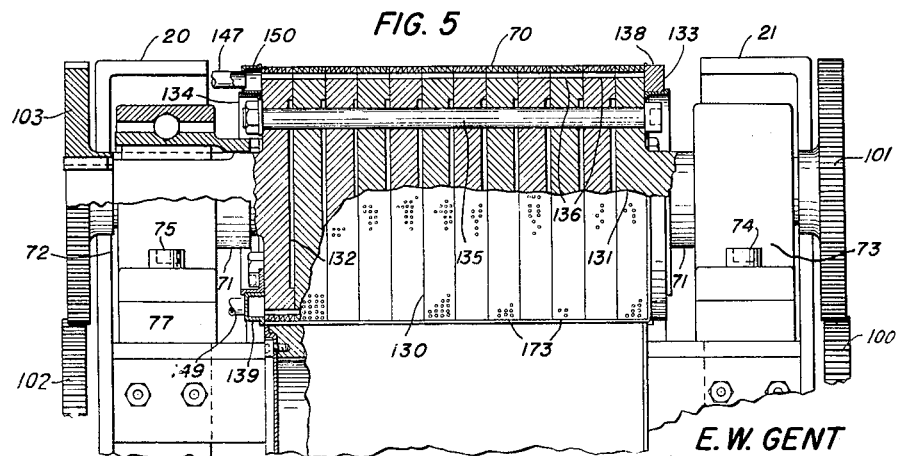

March 21, 1961     E. W. GENT ET AL     2,975,822
MACHINE FOR EMBEDDING BEADS IN A SHEET
Filed Dec. 31, 1947     5 Sheets-Sheet 5
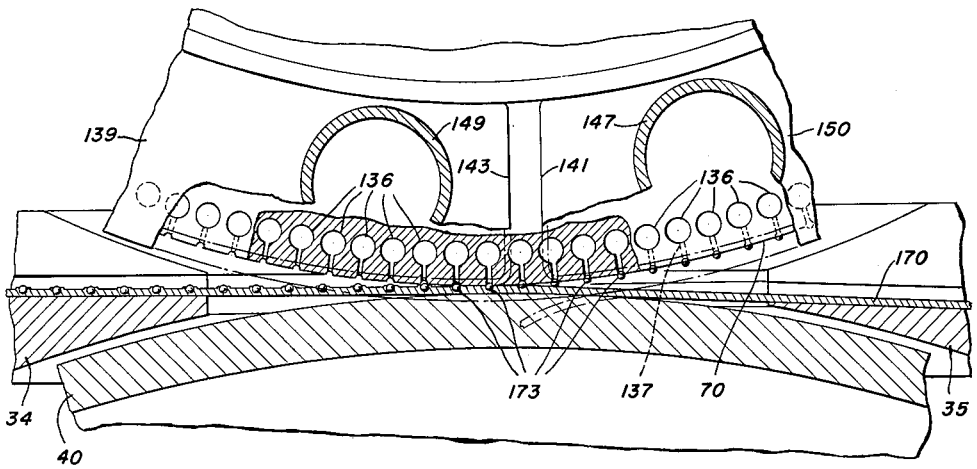
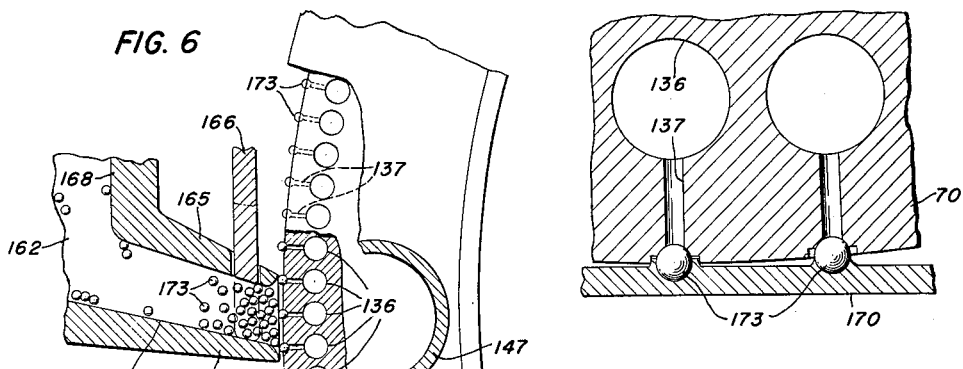
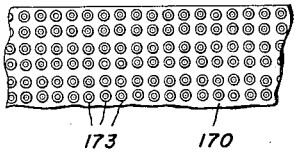
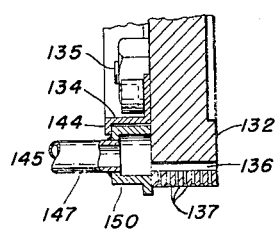
INVENTORS
E. W. GENT
W. W. WERRING
BY
ATTORNEY

UNITED STATES PATENT OFFICE 2,975,822
Patented Mar. 21, 1961

2,975,822

MACHINE FOR EMBEDDING BEADS IN A SHEET

Edgar W. Gent, Morristown, N.J., and Walter W. Werring, New York, N.Y., assignors to Bell Telephone Laboratories, Incorporated, New York, N.Y., a corporation of New York Filed Dec. 31, 1947, Ser. No. 794,928

7 Claims. (Cl. 154—1)

This invention relates to machines for fabricating plates or sheets having beads embedded therein and more particularly to machines of the type used for embedding insulating beads in plates or sheets for use in batteries and now Patent 2,622,271.

One form of battery includes assemblies of plates or sheets of electrode material, such as silver chloride of a thickness in the order of 0.010 inch which are spaced and electrically separated by a multiplicity of insulating bodies, such as glass beads. These bodies are quite small, for example beads of the order of 0.025 inch in diameter, and are very closely spaced, for example of the order of 0.125 inch between centers and are inserted in the sheets sufficiently to leave them projecting in the order of 0.015 inch. Because of the small size and spacing of the bodies or beads manufacture of the plates or sheets entails obvious difficulties.

One object of this invention is to facilitate the production of plates or sheets having bodies embedded therein in prescribed relation.

Another object of this invention is to simplify machines for producing such plates or sheets.

A further object of this invention is to enable the rapid and economic production in quantity of battery plates of the type wherein a multiplicity of insulating beads are embedded in accurately prescribed relation in a sheet of electrode material.

In one illustrative embodiment of this invention, a machine for embedding beads in electrode sheets comprises a rotatable drum having in its outer surface rows of recesses or chamfered perforations, the spacing and arrangement of which correspond to those required for the beads in the completed plate, apparatus for feeding beads into the cavities, and mechanism for holding the beads in the cavities while the drum revolves to embed the beads in a sheet of electrode material.

A feature of this invention relates to the use of negative pressure to attract and retain the beads in the chamfered perforations in the cylindrical surface of a revolving drum during one portion of each revolution of the drum.

Another feature of this invention relates to the application of adhesive such as, for example, printer's ink to the beads that are held in the chamfered perforations of the revolving drum, at one point in each revolution of the drum.

Still another feature of this invention relates to the manner of feeding the beads against one side of a revolving drum where they can be attracted and retained in chamfered perforations of the revolving drum.

A further feature of this invention relates to the use of positive air pressure for expelling beads from the chamfered perforations of the revolving drum, during a portion of the revolution of the drum.

These and other features of the invention will be more clearly and fully understood from the following detailed description of one embodiment of the invention with reference to the accompanying drawings in which:

Fig. 4 is a sectional view taken on line 4—4 of Fig. 2 showing the bead hopper, adhesive container and portions of the frame;

Fig. 5 is a vertical transverse cross-sectional view taken on line 5—5 of Fig. 1 showing the upper drum, its bearings and driving gears;

Fig. 6 is a view, enlarged, of a cross-section of portions of the bead hopper, upper drum and one manifold;

Fig. 7 is a view, enlarged, of a cross-section of portions of the upper drum, lower drum, and the sheet of metal before and after beads are embedded therein;

Fig. 8 is a view, more enlarged, of a portion of the view of Fig. 7 showing the beads being embedded in the sheet of metal;

Fig. 9 is an enlarged view of a portion of the sheet of metal with beads embedded therein; and Fig. 10 is a view, enlarged, of a portion of the upper drum and one manifold thereon.

Figure 1:
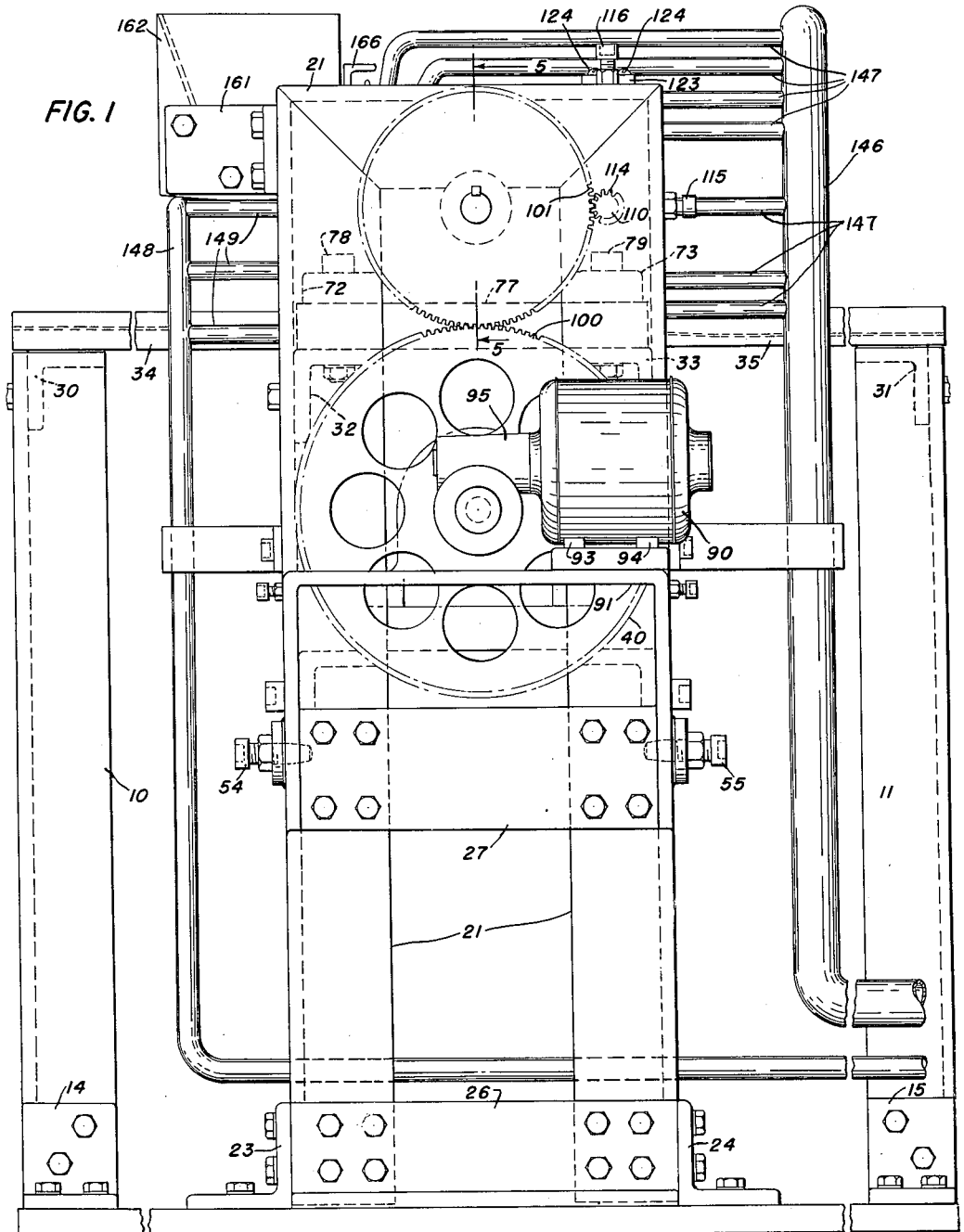
Fig. 1 is a side elevation view showing the table, motor and driving gears.

As shown in the drawing, the machine of this invention includes a table formed of angle bar legs 10, 11, 12, 13 as corner posts with angle piece feet 14, 15, 16, 17 for attachment to the floor, two U-shaped side plates 20, 21 of angle bar material with angle piece feet 22, 23, 24, 25 for attachment to the floor, with bracing plates bolted to side plate 21, shown as plates 26, 27 in Fig. 1, with similar plates on side plate 20 not visible in the drawing. An angle bar cross brace 30 is bolted to the top of legs 10, 13 and extends horizontally between them. A similar brace 31 is bolted to and extends between legs 11 and 12. An angle bar cross brace 32 is bolted to and extends horizontally between the left-hand riser of side plate 20 and side plate 21 at a suitable height thereon to place the top face thereof in the same horizontal plane as the top face of cross brace 30. A similar angle bar cross brace 33 is bolted between the right-hand riser of side plate 20 and side plate 21. A bed plate 34 is rigidly attached to cross braces 30 and 32 by countersunk machine screws 18. Braces 31 and 33 support a similar bed plate 35 in a horizontal position fastened thereto by countersunk machine screws 19. This table supports two rotatable drums, motor, driving gears, bead hopper and fluid container as hereinafter described.

Figure 3:
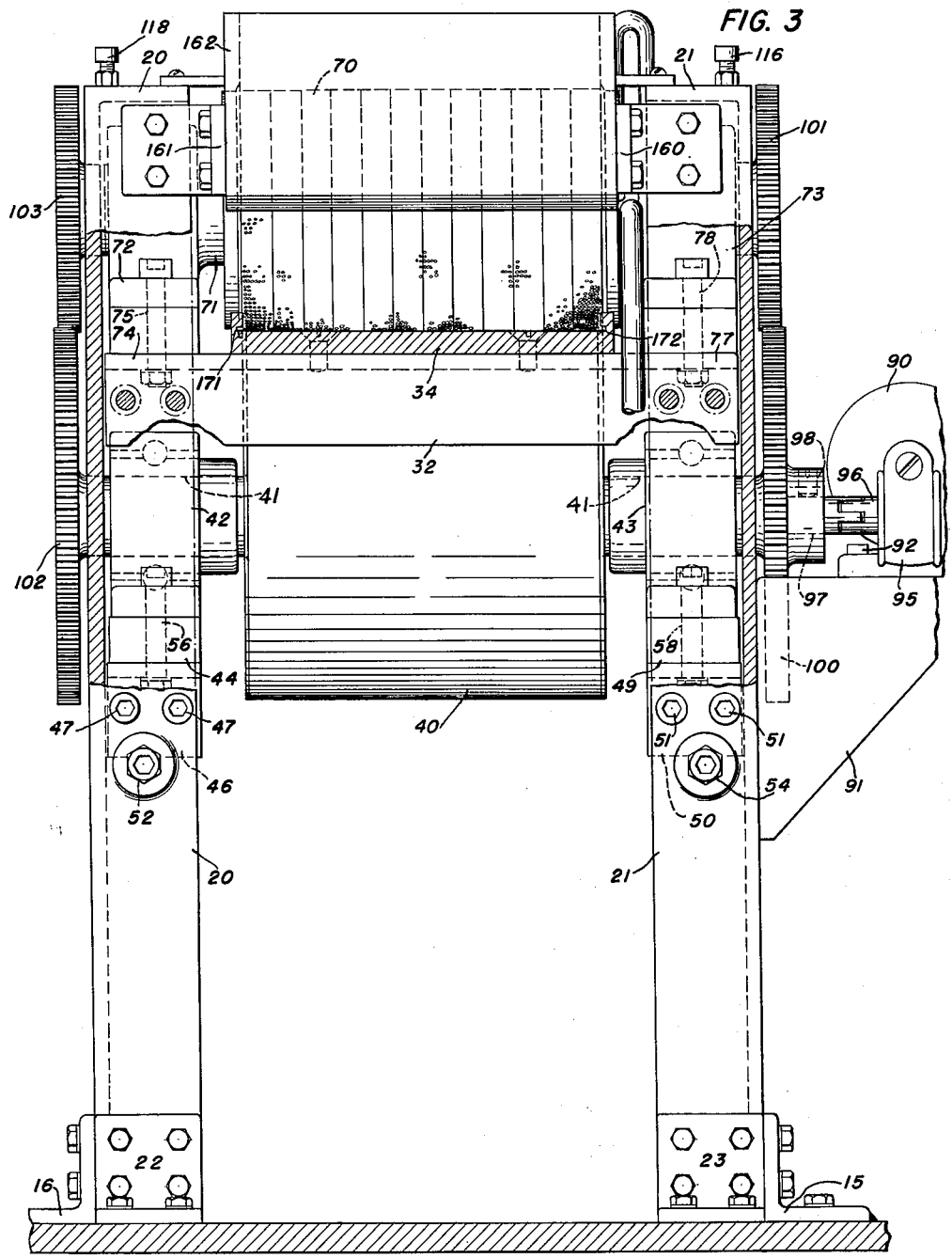
Fig. 3 is an end elevation view of the mechanism of Fig. 1 with one end of the table broken away.

As shown in Fig. 3, lower rotatable drum 40 is rigidly mounted on horizontal shaft 41 which is journaled in bearings 42, 43. Bearing 42 rests upon a cross member 44 which is supported on angle pieces one of which, angle piece 45, is visible in Fig. 3 and rigidly held thereto by bolt 56. The opposite ends of bearing 42 and cross member 44 (not visible in Fig. 3) are similarly bolted to angle piece 45. Bearing 43 similarly rests on a cross member 49 which is supported on angle pieces, one of which, angle piece 50, is visible in Fig. 3. One end of bearing 43 and cross member 49 are rigidly held to the angle piece 50 by bolt 58. The opposite ends of bearing 43 and cross member 49 (not visible in Fig. 3) are similarly bolted to an angle piece. As shown in Fig. 4, angle piece 45 is attached to side plate 20 by bolts 48 and angle piece 46 is attached to side plate 20 by bolts 47. As shown in Fig. 3, angle piece 50 is attached to side plate 21 by bolts 51, and the opposite end of bearing 43 and cross member 49 are similarly supported by an angle piece attached to side plate 21 and which is not visible in Fig. 3.

To adjust drum 40 upward or downward, bolts 47, 48, 51 are loosened and also similar bolts on the fourth angle piece which are not visible in Fig. 3 or Fig. 4. Bolt 52 is threaded through side plate 20 and has a tapered end portion beyond the threads thereon. As shown in Fig. 4 the tapered end portion of bolt 52 supports angle piece 46 when bolts 47 are loosened. One end of angle piece 46 can be raised by turning bolt 52 further into side plate 20 and can be lowered by turning bolt 52 in a direction to withdraw it from side plate 20. Movement of bolt 52 will raise or lower the end of cross member 44 which rests on angle piece 46. Similar movement of bolt 53 will effect movement of the opposite end of cross member 44. Bolts 54, 55 will effect movement of cross member 49 in a similar manner. Raising or lowering cross member 44 will raise or lower bearing 42, and raising or lowering cross member 49 will raise or lower bearing 43. Thus drum 40 may be raised or lowered to bring its upper surface in suitable relation to the upper drum after which bolts 47, 48, 51 and the similar bolts on the angle piece, not visible in the drawing, will be tightened to secure drum 40 at the proper height.

As shown in Fig. 4 the axis of drum 40 is adjustable in a horizontal plane by movement of bearings 42, 43 on cross members 44, 49, respectively by loosening bolts 56 and 57 and then adjusting set screws 59, 60 that thread through side plate 20, and as shown in Fig. 3 by loosening bolt 58 and the corresponding bolt on the opposite end of cross member 49 and then adjusting the set screws that thread through side plate 21 and which make contact with the ends of cross member 49 after which bolts 56, 57, 58 and the corresponding bolt in cross member 49 are again tightened to secure drum 40.

As shown in Figs. 3 and 4, upper drum 70 is rigidly mounted on a horizontal shaft 71 which is journaled in bearings 72, 73. Bearing 72 rests upon a cross member 74 which is supported on angle pieces 32, 33 and is secured thereto by bolts 75, 76. Bearing 73 rests upon cross member 77 which is supported on angle pieces 32, 33 and is secured thereto by bolts 78, 79 shown in Fig. 1.

Figure 2:
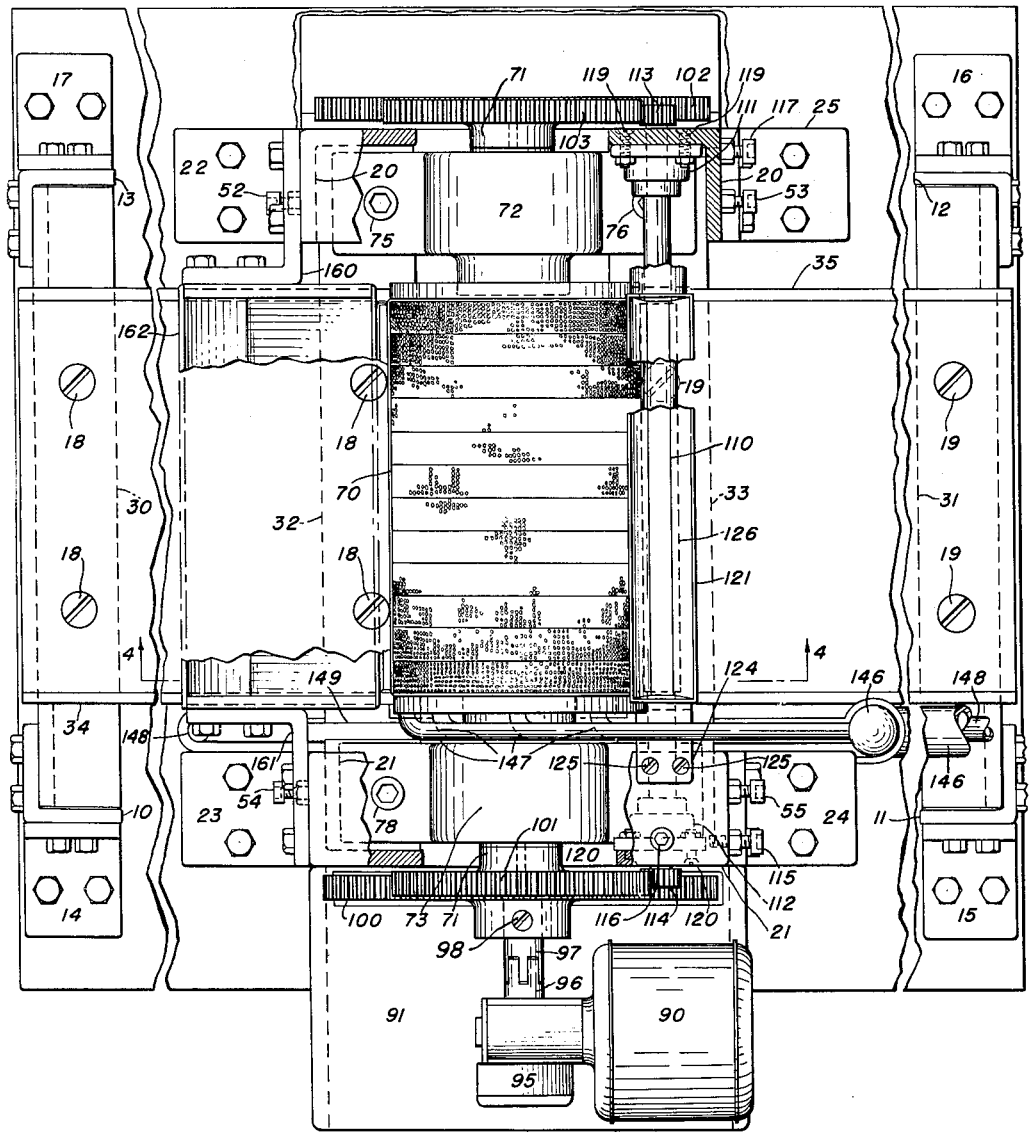
Fig. 2 is a top view of the mechanism shown in Fig. 1.

As shown in Figs. 1, 2 and 3, motor 90 is rigidly mounted on shelf 91 by bolts 92, 93 and 94. Shelf 91 is welded to side plate 21. The armature of motor 90 is normal to the axes of drums 40 and 70. Motor 90 supports a housing 95 which contains worm gearing for translating the rotation of the motor shaft into rotation of shaft 96 which is directly coupled to shaft 41 by shaft 97 which is secured to shaft 41 by set screw 98. Gear wheel 100 is rigidly attached to shaft 41. Gear wheel 101 is rigidly attached to shaft 71. Gear wheels 100 and 101 have teeth on their outer circumferences which mesh together so that gear wheel 100 drives gear wheel 101. The opposite end of shaft 41 has gear wheel 102 rigidly attached thereto, which is the counterpart of gear wheel 100 and shaft 71 has gear wheel 103 rigidly attached thereto, which is the counterpart of gear wheel 101. Gear wheels 102 and 103 mesh together so that gear wheel 102 drives gear wheel 103.

As shown in Fig. 2 a horizontal shaft 110 is supported with its longitudinal axis parallel to the axis of drum 70 in bearings 111, 112 which are secured by bolts 119, 120 to side plates 20, 21, respectively. Spur gears 113, 114 are rigidly secured to the ends of shaft 110 and mesh with gears 103 and 101 respectively for revolving shaft 110 while drum 70 revolves. Shaft 110 is covered with elastic material as, for example, rubber to form roller 126 thereon extending the width of drum 70.

The cylindrical surface of roller 126 revolves adjacent to but slightly apart from the outer cylindrical surface of drum 70. Shaft 110 is adjustable for controlling this close relationship with drum 70. As shown in Fig. 2 the ends of adjustment screws 115, 116, thread through side plate 21 and engage bearing 112, and by loosening bolts 120 the bearing 112 may be adjusted in the vertical or horizontal dimension by adjusting screws 115 or 116 respectively. The opposite end of shaft 110 may be adjusted in the vertical or horizontal dimension in a similar manner by loosening bolts 119 which secure bearing 111 to side plate 20 and then adjusting screws 117 or 118 respectively, which thread through side plate 20.

A container 121 for adhesive fluid shown in Fig. 2 and Fig. 4 is positioned above and parallel to roller 126 and has a funnel-shaped cross-section with a slot along the bottom. A wick 122 is inserted in the slot, extends the full length of the slot and protrudes from the bottom thereof for making contacts with the roller 126 throughout the length of roller 126. Wick 122 may be of porous material as, for example, felt. It is to be understood that other means may be used for applying adhesives to roller 126. Container 121 is supported by extension members 123, 124 thereon which are attached to side plates 20, 21 by screws 125.

As shown in Fig. 5, drum 70 comprises a pile-up of a plurality of discs 130, end discs 131, 132 and end plates 133, 134, the pile-up being rigidly clamped together by a plurality of bolts 135. Each of the discs has a plurality of cavities 136 around its periphery positioned in close proximity to the outer cylindrical surface, this cavity aligning to form a continuous duct from end to end of drum 70. A plurality of closely spaced performations 137 extend from each cavity 136 through the discs 130, 131, 132 to the outer cylindrical surfaces thereof and each perforation 137 is chamfered at its drum surface end. A ring 138 is rigidly clamped on one end of drum 70 by end plate 133 to cover the ends of cavities 136. Disc 132 on the opposite end of drum 70 rigidly supports end plate 134, a portion of which is also shown in Fig. 10.

As shown in Fig. 4, two stationary manifolds 139, 150 are positioned against end plate 132. Manifold 150 extends around one side of end plate 132 with the ends 140, 141 thereof closely adjacent to the ends 142, 143 respectively of manifold 139. As shown in Fig. 10 a lip 144 on end plate 134 overlaps a shoulder 145 on manifold 150 and rotates against this shoulder while drum 70 revolves. Lip 144 similarly overlaps and rotates against a shoulder on manifold 139. Manifold 150 is joined to a riser pipe 146 by a plurality of pipes 147 shown in Fig. 1. Pipe 146 is for connecting manifold 138 to a source of negative air pressure. Manifold 139 is joined to a riser pipe 148 by a plurality of pipes 149. Pipe 148 is for connecting manifold 139 to a source of positive air pressure.

As shown in Figs. 2 and 4 angle pieces 160, 161, bolted to side plates 20, 21, respectively, rigidly support bead hopper 162 which has a tilted bottom 163 inclined to cause beads therein to roll toward a lower corner positioned closely adjacent to drum 70. As shown in Fig. 4 this corner of hopper 162 has a slotted projection extending the full length of drum 70 with the ends of lips 164, 165 adjacent to but slightly apart from the outer cylindrical surface of drum 70 substantially in the same horizontal plane as the axis of drum 70. Lip 165 is slotted lengthwise through which a sliding shutter 166 is inserted as shown in Fig. 4. Fig. 6 shows an enlarged view of the lips 164, 165 of hopper 162 and the lower portion of shutter 166. A set screw 167 is inserted through a slot in shutter 166 and is threaded into the side 168 of hopper 162 for holding shutter 166 in a raised position to permit beads to roll through slotted opening 169 of hopper 162 into contact with drum 70.

The machine of this invention, as described in the foregoing, functions in the following manner. The motor 90 revolves drums 40, 70 and shaft 110. Beads of proper size are placed in hopper 162. Adhesive fluid is placed in container 121. Roller 126 revolving in contact with wick 122 becomes coated with adhesive material. A silver chloride sheet 170 of proper width is fed into guide slots 171, 172 on bed plate 35. Negative air pressure is supplied to pipe 146 and positive air pressure is supplied to pipe 148. With shutter 166 in the raised position the beads in hopper 162 roll into contact with the side of drum 70 and are attracted into and retained in the chamfered perforations therein by the negative air pressure supplied to cavities 136 through manifold 138. Drum 70, as shown in Fig. 4, revolves clockwise and the beads held by drum 70 pass upward and around, making contact with roller 126 during the revolution of drum 70, thereby acquiring a coating of adhesive fluid on the outer portion of the beads.

As shown in Fig. 7, with drum 40 adjusted to the proper height, the silver chloride sheet 170 is shown between drum 40 and the beads held in drum 70. The beads 173 are forced into sheet 170 as shown in Fig. 8, where they are held by the adhesive fluid. Successive rows of beads 173 are thus impressed into sheet 170 as it progresses between drums 40 and 70, sheet 170 emerging at the left end of the machine as shown in Fig. 2. Positive air pressure applied through manifold 139 assists in disengaging beads 173 from the chamfered perforations of drum 70 after the beads 173 have made contact with sheet 170.

High speed continuous manufacture of a uniform product is the chief advantage of the machine of this invention which by reason of its simplicity can be operated by an unskilled person.

While this invention has been disclosed with reference to a specific embodiment, it is understood that it is to be considered as limited in scope by the appended claims only.

What is claimed is:

1. A machine for embedding beads in a sheet, comprising a rotatable drum having parallel rows of recesses at its periphery communicating with the interior of said drum, a container for the beads and having an opening, said drum having a wall in juxtaposition to said opening against which the beads rest to be attracted into the rows of recesses, means for producing a negative pressure in said recesses, means for applying an adhesive to the beads, and means for forcing the beads into the sheet during the rotation of said drum.

2. A machine for embedding spherical beads in a sheet, comprising a rotatable drum having a plurality of closely adjacent internal cavities extending lengthwise from end to end of said drum parallel to the axis of rotation and adjacent to the periphery thereof, each of said cavities having a plurality of perforations extending therefrom to the surface of said drum, each of said perforations being chamfered at the drum surface end thereof, a container for the beads extending horizontally along said drum and having a slot in a lower corner of said container extending horizontally along said drum parallel to the axis thereof adjacent to but slightly apart from the outer surface of said drum, a first stationary manifold positioned against the first end of said rotatable drum, shaped to cover the open ends of said cavities during their rotation from a position substantially adjacent to said container slot through a substantial arc, means for connecting a source of negative pressure to said first manifold for attracting and holding said beads in said chamfered holes in said drum, a first stationary plate positioned against the second end of said drum shaped to cover the opposite ends of the same cavities as are covered by said first manifold, a second stationary manifold positioned against the first end of said drum, shaped to cover the open ends of those cavities not covered by said first manifold, means for connecting a source of positive pressure to said second manifold, a second stationary plate positioned against the second end of said drum and shaped to cover the opposite ends of the same cavities as are covered by said second manifold, a container for adhesive fluid, a wick entering said fluid container through a slot therein extending the full length of said drum, with the exposed end of said wick positioned against said drum for applying adhesive fluid to a revolvable roller extending lengthwise of said drum below said wick and adjacent to said drum for applying adhesive to the beads held in the chamfered perforations in said drum as said beads pass said wick during rotation of said drum, and means for moving said sheet under said drum.

3. A machine for embedding glass balls in a sheet, comprising two rotatable drums mounted on a table with their axes of rotation parallel in a vertical plane, the upper drum being adjustably mounted to raise its underside upward from the plane of the top of said table, the lower drum being adjustably mounted to raise its upper side slightly above said table top, both of said drums being coupled to driving means for rotation in opposite directions, a bead hopper extending lengthwise along said upper drum and having a narrow rectilinear slot adjacent to but apart from said upper drum in a horizontal plane which includes the axis of said upper drum, said upper drum having a plurality of closely adjacent cavities extending through said drum from end to end in proximity to the periphery thereof, each of said cavities having a plurality of perforations extending therefrom to the outer surface of said upper drum with the outer ends chamfered, a first stationary manifold positioned against one end of said upper drum shaped to cover the open ends of said cavities in that portion of said upper drum extending around said upper drum in the direction of rotation of said upper drum from a point adjacent said bead hopper but slightly below the horizontal plane of the axis of said upper drum to a point in the vertical plane of the axis of said upper drum, means for connecting a source of negative air pressure to said first manifold, a first stationary plate on the opposite end of said drum covering the open ends of the cavities covered by said first manifold, a second stationary manifold on the end of said upper drum adjacent to said first manifold covering the open ends of the cavities not covered by said first manifold, means for connecting a source of positive air pressure to said second manifold, and a second plate on the opposite end of said drum covering the open ends of said cavities covered by said second manifold.

4. A machine for embedding balls in a plate, comprising upper and lower rotatable metallic cylinders with parallel axes in the same vertical plane, the lower surface of said upper cylinder being closely adjacent to the upper surface of said lower cylinder, means for rotating said cylinders in opposite directions, means including a container for storing the balls adjacent to said upper cylinder for continuously feeding said balls through a slot in said container against one side of said upper cylinder in a horizontal row along the periphery of said upper cylinder, a plurality of spaced cavities extending lengthwise through said upper cylinder from end to end parallel to the axis of rotation thereof, spaced perforations extending from said cavities through said upper cylinder surface and having their outer ends chamfered, a first means for applying negative pressure to those of said cavities which at any moment during rotation of said upper cylinder lie in that end portion of said cylinder which extends upward and around said cylinder from said bead container slot down to a point substantially in a vertical plane with the axis of rotation of said upper cylinder, a second means for applying positive pressure to those of said cavities in said upper cylinder not having negative pressure applied thereto, and means for applying adhesive material to the balls which are attracted into said chamfered openings by said negative air pressure during their rotation with said upper drum.

5. A machine for embedding balls in a sheet of material, said machine comprising a rotatable drum having chamfered perforations through the periphery thereof communicating with the interior of said drum, means for applying negative pressure to the interior of said drum during rotation thereof, means adjacent to one side of said drum for storing and continuously feeding the balls against one side of said drum for attraction to said chamfered perforations by said negative pressure within said drum, means for applying adhesive during rotation of said drum to the balls held to said chamfered perforations by said negative pressure within said drum, and means for pressing the balls held to said drum partially into the sheet of material during the rotation of said drum where they are held by the adhesive.

6. A machine for embedding beads in a plate comprising a mounting frame, a horizontal table mounted on said frame, two rotatable drums adjustably mounted on said frame with their axes of rotation parallel one above the other and with their adjacent surfaces movable up or down from the top of said table, said drums being coupled to a driving means mounted on said frame for rotating said drums in opposite directions, a bead hopper lengthwise of and adjacent to one side of the upper drum, a slot in the side of said hopper adjacent to said upper drum for continuously feeding beads against the side of said upper drum, a plurality of closely adjacent longitudinal cavities extending through said upper drum from end to end near the outer cylindrical surface thereof, a plurality of chamfered perforations extending from said cavities through the outer cylindrical surface of said upper drum, a container for adhesive fluid extending the length of said upper drum and having a wick protruding from said container and in contact with said upper drum throughout the full length thereof, means for applying negative pressure to those of said cavities that lie in the arc of rotation of said upper drum extending from said slot to a point in the vertical plane of the axes of said two drums, and means for applying positive pressure to those cavities to which negative pressure is not applied.

7. A machine for embedding spherical glass beads in a sheet, comprising a rotatable drum, a table for supporting said drum, means for storing said beads and feeding them continuously against one side of said drum during the rotation thereof, means for attracting and retaining said beads on said drum during rotation thereof, means for applying adhesive to said beads during rotation of said drum, means for pressing said beads into said sheet where they are held by adhesive when said beads arrive at the under-side of said drum in the rotation thereof, and means for advancing said sheet through said machine as said beads are impressed therein.

References Cited in the file of this patent
UNITED STATES PATENTS

| | | |
|---|---|---|
| 1,060,098 | Kaufmann | Apr. 29, 1913 |
| 2,083,042 | Storch | Apr. 8, 1937 |
| 2,171,193 | Rau | Aug. 29, 1939 |
| 2,398,888 | Ford | Apr. 23, 1946 |
| 2,405,074 | Underwood | July 30, 1946 |